US012793586B2

(12) United States Patent
Jiang

(10) Patent No.: US 12,793,586 B2
(45) Date of Patent: Nov. 10, 2026

(54) METHOD AND SYSTEM FOR CORRECTING NONUNIFORMITY OF NEAR-EYE DISPLAYS

(71) Applicant: Hue Inc., Shanghai (CN)

(72) Inventor: Xingtong Jiang, Shanghai (CN)

(73) Assignee: Hue Inc., Shanghai (CN)

( * ) Notice: Subject to any disclaimer, the term of this patent is extended or adjusted under 35 U.S.C. 154(b) by 85 days.

(21) Appl. No.: 19/004,123

(22) Filed: Dec. 27, 2024

(65) Prior Publication Data

US 2025/0218319 A1 Jul. 3, 2025

(30) Foreign Application Priority Data

Dec. 29, 2023 (WO) ................ PCT/CN2023/143061

(51) Int. Cl.
*G09G 3/00* (2006.01)
*H04N 13/128* (2018.01)
(Continued)

(52) U.S. Cl.
CPC ........... *G09G 3/003* (2013.01); *H04N 13/327* (2018.05); *H04N 13/332* (2018.05); *G09G 2320/0233* (2013.01); *G09G 2320/0242* (2013.01); *G09G 2320/0626* (2013.01); *G09G 2320/0666* (2013.01); *G09G 2320/0693* (2013.01);
(Continued)

(58) Field of Classification Search
CPC ........... G09G 3/003; G09G 2320/0233; G09G 2320/0242; G09G 2320/0626; G09G 2320/0666; G09G 2320/0693; G09G 2340/0407; H04N 13/327; H04N 13/332; H04N 13/128; H04N 13/156; H04N 13/133
See application file for complete search history.

(56) References Cited

U.S. PATENT DOCUMENTS 11,202,043 B1 * 12/2021 Elazhary ............ G02B 27/0176
11,733,773 B1 * 8/2023 Buckley .................. G06F 3/013
345/589
(Continued)

FOREIGN PATENT DOCUMENTS

CN 110967166 A 4/2020
CN 115989672 A 4/2023
(Continued)

OTHER PUBLICATIONS

International Search Report and Written Opinion of International Application No. PCT/CN2023/143061, dated Sep. 25, 2024.

*Primary Examiner* — Xin Sheng
(74) *Attorney, Agent, or Firm* — FINNEGAN, HENDERSON, FARABOW, GARRETT & DUNNER, LLP

(57) ABSTRACT

A method for correcting nonuniformity of a near-eye display (NED) having a first display and a second display, the method including: generating and displaying a test pattern for the first display and the second display; obtaining, in response to the test pattern, a first image at an end of a first optical path coupled to the first display and a second image at an end of a second optical path coupled to the second display; fusing the first image and the second image to generate a fusion image; and determining a correction scheme for correcting nonuniformity of the NED based on the fusion image.

23 Claims, 10 Drawing Sheets

(51) Int. Cl.

| | |
|---|---|
| ***H04N 13/133*** | (2018.01) |
| ***H04N 13/156*** | (2018.01) |
| ***H04N 13/327*** | (2018.01) |
| ***H04N 13/332*** | (2018.01) |

(52) U.S. Cl.

CPC ... *G09G 2340/0407* (2013.01); *H04N 13/128* (2018.05); *H04N 13/133* (2018.05); *H04N 13/156* (2018.05)

(56) References Cited

U.S. PATENT DOCUMENTS

| | | | | |
|---|---|---|---|---|
| 2018/0098056 | A1* | 4/2018 | Bohn | G02B 27/017 |
| 2018/0293041 | A1* | 10/2018 | Harviainen | H04N 13/332 |

FOREIGN PATENT DOCUMENTS

| | | | |
|---|---|---|---|
| CN | 115989678 | A | 4/2023 |
| WO | 2020214162 | A1 | 10/2020 |

* cited by examiner

METHOD AND SYSTEM FOR CORRECTING NONUNIFORMITY OF NEAR-EYE DISPLAYS

CROSS-REFERENCE TO RELATED APPLICATIONS

This disclosure claims the benefits of priority to PCT Application No. PCT/CN2023/143061, filed on Dec. 29, 2023, which is incorporated herein by reference in its entirety.

TECHNICAL FIELD

The present disclosure generally relates to near-eye display technology, and more particularly, to a method and a system for correcting nonuniformity of a near-eye display.

BACKGROUND

Near-eye displays (NEDs) may be provided as an augmented reality (AR) display, a virtual reality (VR) display, a Head Up/Head Mount, or other displays. Generally, an NED usually includes an image generator and optical paths including optical combiners. The image generator is commonly a projector with micro displays (e.g., micro-LED (light-emitting diode), micro-OLED (organic light-emitting diode), LCOS (liquid crystal on silicon), or DLP (digital light processing)) and an integrated optical lens. The optical combiner includes reflective and/or diffractive optics, such as freeform mirror/prism, birdbath, cascaded mirrors, or grating coupler (waveguide). A virtual image is rendered from an NED to human eyes with/without ambient light.

Uniformity is one key performance for evaluating the imaging quality of an NED. Nonuniformity can be caused by imperfections of display pixels and the optical paths to guide the light emitted by the display, and it has variation in global distribution, and also variation in local zones called Mura. The visual artefact may seem like a mottled appearance, a bright spot, a black spot, or a cloudy appearance. For the NEDs such as an AR/VR display, the visual artefact is also observable on the virtual image rendered in the display system. In the virtual image rendered in the AR/VR display, nonuniformity may be shown in luminance and chromaticity. Moreover, the visual artefact caused by nonuniformity is more obvious due to the closeness to human eyes when compared with traditional displays.

Therefore, there is a need for improving the nonuniformity of an NED.

SUMMARY OF THE DISCLOSURE

Embodiments of the present disclosure provide nonuniformity correction of an NED including a first display and a second display. The method includes: generating and displaying a test pattern for the first display and the second display; obtaining, in response to the test pattern, a first image at an end of a first optical path coupled to the first display and a second image at an end of a second optical path coupled to the second display; fusing the first image and the second image to generate a fusion image; and determining a correction scheme for correcting nonuniformity of the NED based on the fusion image.

Embodiments of the present disclosure provide a system for correcting nonuniformity of an NED including a first display and a second display. The system includes: a light measuring device (LMD) configured to: obtain, in response to a test pattern being displayed by the first display and the second display, a first image at an end of a first optical path coupled to the first display and a second image at an end of a second optical path coupled to the second display; a processor configured to: fuse the first image and the second image to generate a fusion image; and determine a correction scheme for correcting nonuniformity of the NED based on the fusion image.

Embodiments of the present disclosure provide a non-transitory computer-readable storage medium storing a set of instructions that are executable by one or more processors of a device to cause the device to perform operations for correcting nonuniformity of an NED, the operations including: generating and displaying a test pattern for the first display and the second display; obtaining, in response to the test pattern, a first image at an end of a first optical path coupled to the first display and a second image at an end of a second optical path coupled to the second display; fusing the first image and the second image to generate a fusion image; and determining a correction scheme for correcting nonuniformity of the NED based on the fusion image.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

Figure 1:
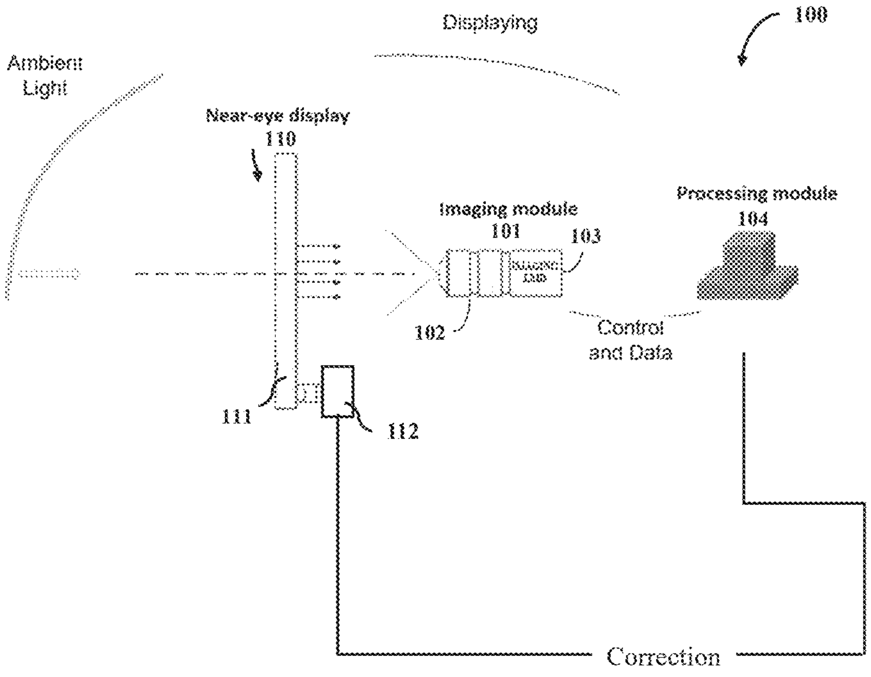
FIG. 1 is a schematic diagram of an exemplary system for correcting nonuniformity of an NED, according to some embodiments of the present disclosure.

FIG. 1 is a schematic diagram of an exemplary system 100 for correcting nonuniformity of an NED, according to some embodiments of the present disclosure. As shown in FIG. 1, system 100 is used for correcting nonuniformity of a near-eye display (NED) 110. Typically, NED 110 is used for displaying images to human eyes, and NED 110 can be included in an AR device or a VR device, such as a Head-Up/Head-Mount display, a projector or other displays. In the present disclosure, system 100 is provided for replacing human eyes to evaluate the imaging quality of NED 110 and correct potential nonuniformity accordingly.

In some embodiments, NED 110 includes an image generator 111. Image generator 111 is provided as one or more micro displays (e.g., one display for one eye), such as micro-LED displays, micro-OLED displays, LCOS displays, or DLP displays, and each of the micro displays can be configured as a light engine with an additional projector lens. In some embodiments, the display may be coupled with a plurality of lenses (also referred to as a "lens group", "designed optics", etc.) for adjusting the image displayed by the micro display in a manner applicable to human eyes. The micro display of image generator 111 includes a micro light emitting array which can form an active emitting area. The projected image from the light engine through designed optics is transferred to human eyes via an optical path including an optical combiner (not shown). The optics of the optical combiner can be reflective and/or diffractive optics, such as a free form mirror/prism, birdbath, or cascaded mirrors, grating coupler (waveguide), etc.

Image generator 111 includes a driving integrated circuit (IC, not shown in FIG. 1). The driving IC includes necessary software and hardware for driving image generator 111. In some embodiments, a control board 112 is further provided in NED 110 for image displaying. Control board 112 can be coupled to communicate with NED 110, specifically to communicate with image generator 111 of NED 110 and control thereto. A driving system of NED 110 may include image generator 111 and control board 112.

Figure 2:
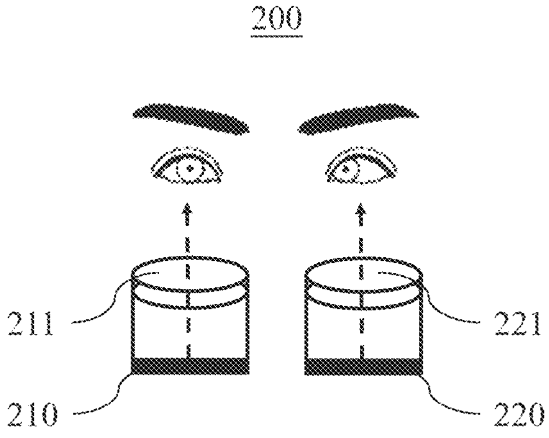
FIG. 2 is a schematic diagram of an exemplary VR system according to some embodiments of the present disclosure.
Figure 3A:
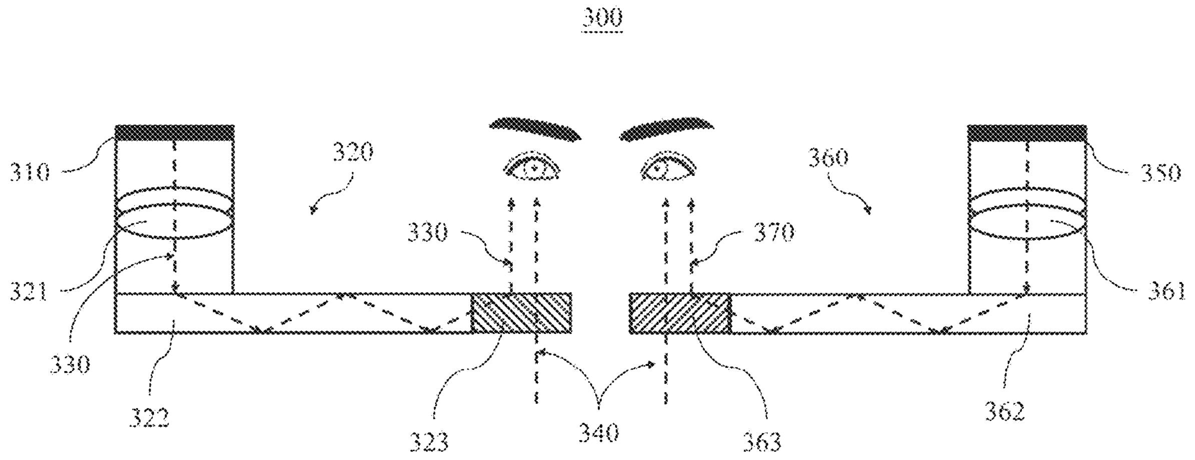
FIG. 3A is a schematic diagram of an exemplary AR system according to some embodiments of the present disclosure.

FIG. 2 is a schematic diagram of an exemplary VR system 200 and FIG. 3A is a schematic diagram of an exemplary AR system 300, according to some embodiments of the present disclosure. Referring to FIG. 2, VR system 200 includes a first micro display 210 (e.g., a right display) and a corresponding lens group 211 for adjusting (e.g., magnifying) the image displayed by first micro display 210 in a manner applicable to a viewer's right eye. Similarly, VR system 200 also includes a second micro display 220 (e.g., a left display) and a corresponding lens group 221 for adjusting the image displayed by second micro display 220 in a manner applicable to a viewer's left eye.

It is to be noted that "left" and "right" mentioned in the present disclosure are from the perspective view from a person (i.e., a user or a viewer of system 200) shown in FIG. 2. In the present disclosure, the light path from a micro display to a human eye is also called an optical path, which can include several optical components. That is, lens group 221 and lens group 222 are within respective optical paths and are deemed as optical components of their respective optical paths.

As can be appreciated, first micro display 210 can be used to display a right image, while second micro display 220 can be used to display a left image captured or rendered at a different angle from the right image. When simultaneously viewing the left image and right image, the brain of the viewer combines these two images into a three-dimensional scene. However, if the uniformity within either the left image or the right image, or the uniformity between the left image and the right image is not ideal, a "sense of place" of the three-dimensional scene created by these two images can be affected. The nonuniformity can be caused by one or more of second micro display 220, first micro display 210, lens group 221, or lens group 222. For example, when driven by a signal indicating a same intensity of brightness, some pixels in either or both of first micro display 210 and second micro display 220 may be brighter compared with the others.

Referring to FIG. 3A, AR system 300 includes a first micro display 310 (e.g., a right display) and its corresponding optical path 320 for passing the image displayed by first micro display 310 to the right eye of the viewer. As can be seen, optical path 320 includes a lens group 321, a waveguide 322, and an optical combiner 323. Lens group 321 is configured to adjust the image displayed by first micro display 310. Waveguide 322 can be used for directing light 330 emitted from first micro display 310 by several total reflections. Optical combiner 323 directs light 330 emitted from first micro display 310 and may allow ambient light 340 to pass through. Hence, both light 330 and ambient light 340 can reach the right eye of the viewer, and the viewer sees an image to be superimposed on an environment scene. Similarly, AR system 300 also includes a second micro display 350 (e.g., a left display) and its corresponding optical path 360 for passing the image displayed by second micro display 350 to the left eye. Typically, second micro display 350 is of the same resolution as first micro display 310. Optical path 360 is composed of a lens group 361, a waveguide 362, and an optical combiner 363. As can be appreciated, the viewed images can be affected by anything between the displays and human eyes. That is, the viewed images can be affected by one or more of first micro display 310, second micro display 350, optical path 320, or optical path 360. When a nonuniformity exists in the viewed images, the imaging effect of AR system 300 deteriorates.

Refer back to FIG. 1, system 100 includes an imaging module 101, for example, an imager, and a processing module 104, for example, a processor. Imaging module 101 is configured to emulate the human eye to measure display optical characteristics and to observe display performance. In some embodiments, imaging module 101 can include a light measuring device (LMD) 103 and a lens 102. For example, LMD 103 can be a colorimeter or an imaging camera, such as a CCD (charge coupled device) or a CMOS (complementary metal oxide semiconductor) image sensor. Lens 102 can be NED lens or normal lens, according to an absolute or relative value measure. Lens 102 of imaging module 101 is provided with a front aperture having a small diameter of, e.g., 1 mm-6 mm. Lens 102 can provide a wide FOV (Field of View) in front, and lens 102 is configured to emulate a human eye to observe NED 110. The optical properties of a virtual image displayed by NED 110 are captured by imaging module 101 and measured by processing module 104.

Processing module 104 is configured to evaluate and improve the uniformity of the virtual image rendered by NED 110. In some embodiments, processing module 104 can be included in a computer or a server. In some embodiments, processing module 104 can be deployed in the cloud, which is not limited herein. In some embodiments, processing module 104 can include one or more processors.

Figure 3B:
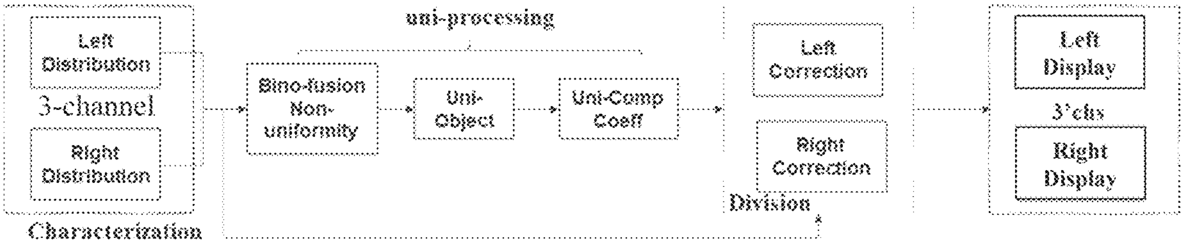
FIG. 3B is a schematic diagram illustrating an exemplary process for binocular nonuniformity correction of an NED, according to some embodiments of the present disclosure.

FIG. 3B is a schematic diagram illustrating an exemplary process for binocular nonuniformity correction of an NED, according to some embodiments of the present disclosure. As shown in FIG. 3B, the process characterizes the imaging quality of the left image and the right image of an NED by measuring the distributions of the left and right images (denoted as "Left Distribution" and "Right Distribution" respectively in FIG. 3B). The left and right images are generated by, for example, two 3-channel (e.g., red, green, blue) displays that are included in the NED. The image quality characterizations of the left image and right image can then be processed together, denoted as "uni-processing" in FIG. 3B: First, the uni-processing fuses these two images to yield bino-fusion nonuniformity of the fused image. Second, a united object (designated "Uni-Object" in FIG. 3B, e.g., an objective pixel value) for each pixel in the fused image can be determined. Last, the uni-processing determines a coefficient for each pixel (designated "Uni-Comp Coeff" in FIG. 3B, e.g., a coefficient matrix) for correcting nonuniformity detected in the fused image. The determined coefficients can be assigned to correct the left image and the right image. Specifically, the coefficients can be sent to the left display and right display of the NED for correction. Alternatively, in some embodiments, the coefficients for the left image and the right image can be separately generated according to the Left Distribution and the Right Distribution. In this alternative, the left image and the right image are corrected without considering the uniformity between these two images.

Figure 4:
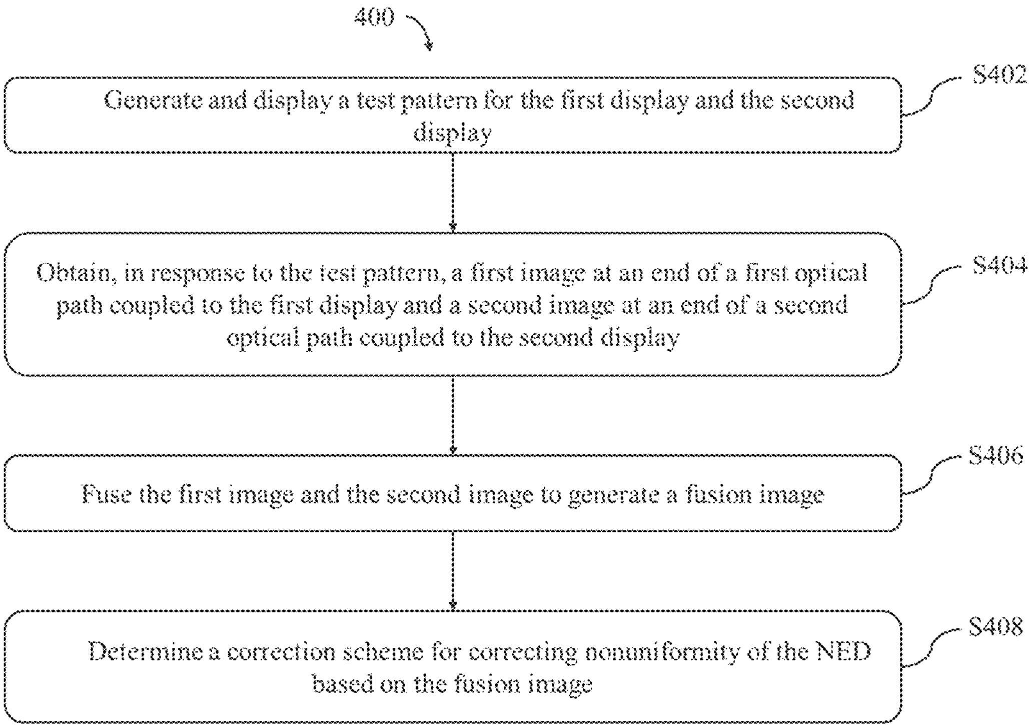
FIG. 4 illustrates a flowchart of an exemplary method for correcting nonuniformity of an NED, according to some embodiments of the present disclosure.

FIG. 4 illustrates a flowchart of an exemplary method 400 for correcting nonuniformity of an NED including a first display and a second display, according to some embodiments of the present disclosure. The NED can be either a VR system or an AR system as described above with reference to FIGS. 2 and 3A, respectively, and the first display and the second display can be the first micro display and the second micro display, respectively. Method 400 includes steps S402 to S408, which can be implemented by a measuring system (such as system 100 in FIG. 1).

At step S402, one or more test patterns are generated for the first display and the second display for displaying. For example, with further reference to AR system 300 in FIG. 3A, in order to measure the imaging property of a left imaging branch including first micro display 310 and optical path 320 and the imaging property of a right imaging branch including second micro display 350 and optical path 360, a common test pattern can be generated for both first micro display 310 and second micro display 350. In some embodiments, only a subset of the pixels in first micro display 310 and second micro display 350 need correction. As such, a test pattern targeting the subset of pixels can be generated. For example, a red image targeting red pixels can be generated for correcting the nonuniformity caused by red pixels.

In some embodiments, all the pixels in first micro display 310 and second micro display 350 need correction. In this situation, multiple test patterns can be generated for the displays to measure the performance of the displays for different imaging situations. For example, first micro display 310 and second micro display 350 include three kinds of fundamental pixels—red pixels, green pixels, and blue pixels, hence complete nonuniformity correction of AR system 300 may need testing all these pixels. That is, the multiple test patterns can be generated to light all the red pixels, green pixels, and blue pixels for observing the property of these pixels. As first micro display 310 and second micro display 350 are typically driven by signals in RGB chroma space, in some embodiments, the multiple test patterns can include a standard red pattern, a standard green pattern, and a standard blue pattern in RGB chroma space. In this manner, all the red pixels, green pixels, and blue pixels of first micro display 310 and second micro display 350 can be lighted by the standard red pattern, the standard green pattern, and the standard blue pattern in sequence.

In some embodiments, the test pattern can be a white pattern in RGB chroma space. As can be appreciated, compared with chroma nonuniformity, luminance nonuniformity can be more easily observed by a viewer. Typically, a white dot in the test pattern is rendered by red pixels, green pixels, and blue pixels in the display. Hence, a white pattern will trigger at least a part of the red pixels, green pixels, and blue pixels, and correction to this part of pixels will alleviate the nonuniformity of and/or between first micro display 310 and second micro display 350.

As described above, waveguide 322 and optical combiner 323 are provided in optical path 320, while waveguide 362 and optical combiner 363 are provided in optical path 360. The imaging quality of AR system 300 can also be affected by optical path 320 or optical path 360. Specifically, at least a part of the nonuniformity in AR system 300 maybe caused by optical combiner 323 and optical combiner 363. With the correction method provided in the present disclosure, this source of nonuniformity is eliminated or at least diminished.

Referring back to FIG. 4, at step S404, in response to the displayed test pattern on the first display and the second display, a first image is obtained at an end of a first optical path coupled to the first display, and a second image is obtained at an end of a second optical path coupled to the second display. For example, with further reference to FIG. 3A, an imaging module (e.g., imaging module 101 in FIG. 1) can be disposed at the end of optical path 320 to capture the right image corresponding to the displayed test pattern shown by first micro display 310. In the present disclosure, the imaging module can be disposed at a distance similar to that of an eye from optical combiner 323 of AR system 300. "At the end" implies that the imaging module is disposed after the end of the optical path and can obtain a full image such as an eye could see. In other words, the imaging module may not be disposed in contact with the end of the optical path. Similarly, another imaging module (e.g., imaging module 101 in FIG. 1) can be disposed at the end of optical path 360 to capture the left image corresponding to the displayed test pattern shown by second micro display 350. In some other embodiments, one imaging module can be used to capture the left image and the right image. The displaying time of the left image and the right image may be long enough for the imaging module to shift from one end of the optical path to another.

Figure 7:
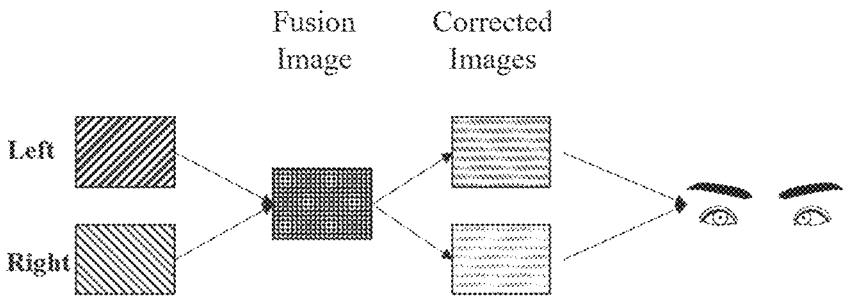
FIG. 7 is a schematic diagram illustrating an exemplary process for binocular nonuniformity correction of an NED, according to some embodiments of the present disclosure.

Referring back to FIG. 4, at step S406, the first image and the second image are fused to generate a fusion image. FIG. 7 is a schematic diagram illustrating an exemplary process for binocular nonuniformity correction of an NED, according to some embodiments of the present disclosure. As shown in FIG. 7, the left image and the right image are fused together to form a fusion image. The fusion image is a combined image in the human mind of the left Image viewed by the left eye and the right image viewed by the right eye. Apart from the examples given below, the left image and the right image can be fused in many ways. The present disclosure is not limited by the manner in which the fusion image is generated.

Figure 5:
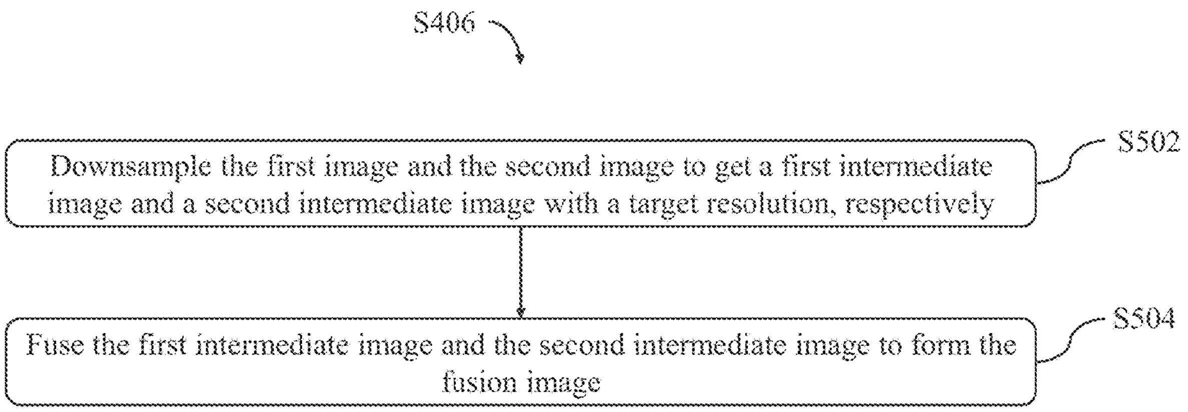
FIG. 5 illustrates a flowchart of sub-steps of the exemplary method for correcting nonuniformity of an NED shown in FIG. 4, according to some embodiments of the present disclosure.

FIG. 5 illustrates a flowchart of sub-steps of method 400 for correcting nonuniformity of an NED, according to some embodiments of the present disclosure. As shown in FIG. 5, step S406 includes sub-steps S502 and S504.

At sub-step S502, the first image and the second image are downsampled to obtain a first intermediate image and a second intermediate image having a target resolution. The images captured by an imaging module may have a fine resolution (e.g., 9000×6000), which may be too large for image processing. In some embodiments, the resolution of these images can be lowered by pixel decimation. As used herein, pixel decimation refers to a process by which the number of pixels in an image is reduced, e.g., downsampled. For example, with further reference to FIG. 3A, the target resolution can be set equal to a display resolution of first micro display 310 (or second micro display 350), such as 640×480. In an example, 640×480 pixels from 9000×6000 pixels from the first image and the second image are selected to represent the first image and the second image, which are called a first intermediate image and a second intermediate image. For example, the 9000×6000 pixels are decimated, i.e., reduced in numbers, in a uniform manner both in the horizontal and vertical directions. In some other examples, the first image and the second image are scaled in a manner such that a representative pixel is the average of its nearest pixels.

Figure 8:
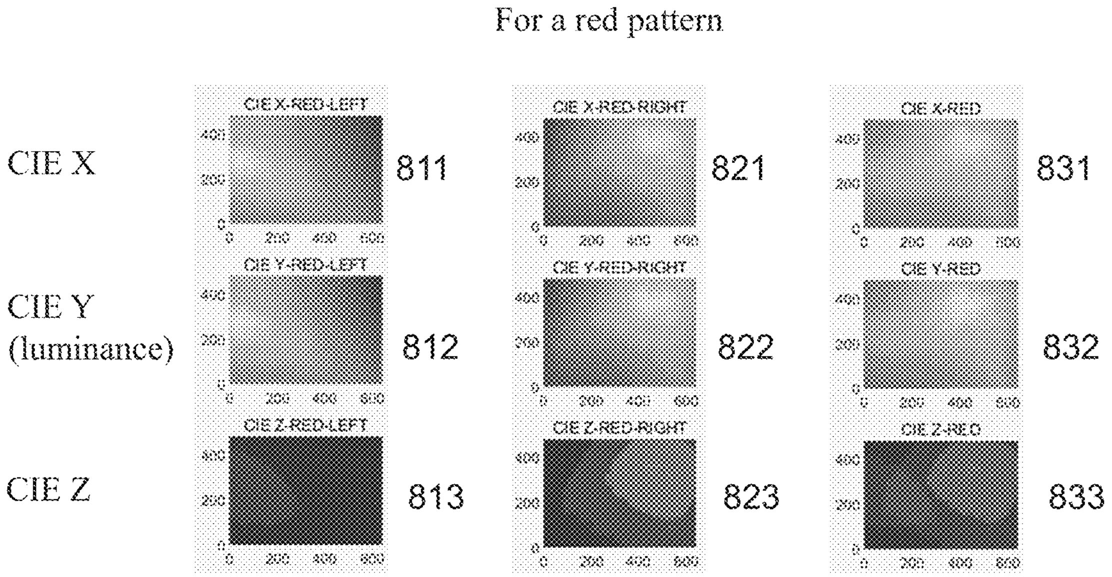
FIG. 8 illustrates an example of intermediate images and corresponding fusion images, according to some embodiments of the present disclosure.

At sub-step S504, the first intermediate image and the second intermediate image are fused to form the fusion image. FIG. 8 illustrates an example of intermediate images and corresponding fusion images, according to some embodiments of the present disclosure. Continuing with the embodiment discussed above, three test patterns including a standard red pattern, a standard green pattern, and a standard blue pattern in RGB chroma space can be displayed in sequence. When a standard red pattern is displayed on the first display and the second display (e.g., first micro display 310 and second micro display 350 in FIG. 3A), a left image and a right image can be obtained by the imaging module (e.g., imaging module 101 in FIG. 1). In some embodiments, the first image and the second image are represented in CIE (Commission Internationale de l'Eclairage, or International Commission on illumination) XYZ chroma space. As a result, the first intermediate image, the second intermediate image, and the fusion image are represented in XYZ chroma space as well. Hence, the first intermediate image, the second intermediate image, and the fusion image can be decomposed into CIE X components, CIE Y components, and CIE Z components. As shown in FIG. 8, an image 811 represents the left intermediate image based on the standard red pattern represented in CIE X components, an image 812 represents the left intermediate image based on the standard red pattern represented in CIE Y (luminance) components, and an image 813 represents the left intermediate image based on the standard red pattern represented in CIE Z components. Similarly, an image 821 represents the right intermediate image based on the standard red pattern represented in CIE X components, an image 822 represents the right intermediate image based on the standard red pattern represented in CIE Y (luminance) components, and an image 823 represents the right intermediate image based on the standard red pattern represented in CIE Z components. Moreover, an image 831 represents the fusion image of the first intermediate image and the second intermediate image represented in CIE X components, an image 832 represents the fusion image of the first intermediate image and the second intermediate image represented in CIE Y (luminance) components, and an image 833 represents the fusion image of the first intermediate image and the second intermediate image represented in CIE Z components The fusing method described above to form the fusion image can also be applicable to the standard green pattern and the standard blue pattern, and is not repeated here. In the present disclosure, although images denotated as "CIE X-RED-LEFT", "CIE Z-RED-LEFT", "CIE X-RED-RIGHT", "CIE Z-RED-RIGHT", "CIE X-RED", and "CIE Z-RED" are used to represent a picture's chroma components, they can be expressed in a grayscale showing the intensity of X, Y and Z components of each pixel.

In some embodiments, the first image and the second image are represented by grayscale, and a grayscale value of a pixel in a target location (e.g., with the coordinates of (x, y) in a 640×480 image) of the fusion image is equal to the grayscale value of a pixel in the target location of the first intermediate image plus the grayscale value of a pixel in the target location of the second intermediate image. This process can be represented by the following formula:

$$\text{Gray\_fusion}(x, y) = \text{Gray\_left}(x, y) + \text{Gray\_right}(x, y) \quad (1)$$

wherein Gray_fusion (x, y) denotes the grayscale value of a pixel in the target location of the fusion image, Gray_left (x, y) denotes the grayscale value of a pixel in the target location of the left image, and Gray_right (x, y) denotes the grayscale value of a pixel in the target location of the right image.

In some other embodiments, a grayscale value of a pixel in a target location of the fusion image can be calculated in a more complex manner that is more consistent with the working mechanism of the human visual system. The present disclosure is not limited by the manner in which the grayscale value of a pixel in a target location is calculated.

In some embodiments, the correction method is applied to luminance nonuniformity and chromaticity nonuniformity. Hence, at step S504, both luminance components and chromaticity components of the first intermediate image and the second intermediate image are fused to form the fusion image. In some embodiments, the correction method may focus on luminance nonuniformity. Hence, at step S504 only luminance components of the first intermediate image and the second intermediate image are fused to form the fusion image. That is, with further reference to FIG. 8, only the images denoted as "CIE Y-RED" (i.e., image 812 and image 822) are retained for fusing to form the fusion image for further processing, while the pictures denoted as "CIE X-RED" (i.e., image 811 and image 821) and "CIE Z-RED" (i.e., image 813 and image 823) are discarded.

Referring back to FIG. 4, at step S408, a correction scheme is determined for correcting nonuniformity of the NED based on the fusion image. In this manner, the correction scheme can be determined according to a binocular fusion, and the determined scheme will reflect the real working mechanism of the human visual system. Moreover, the nonuniformities of two optical paths and between two optical paths can be corrected in a single process.

Figure 6:
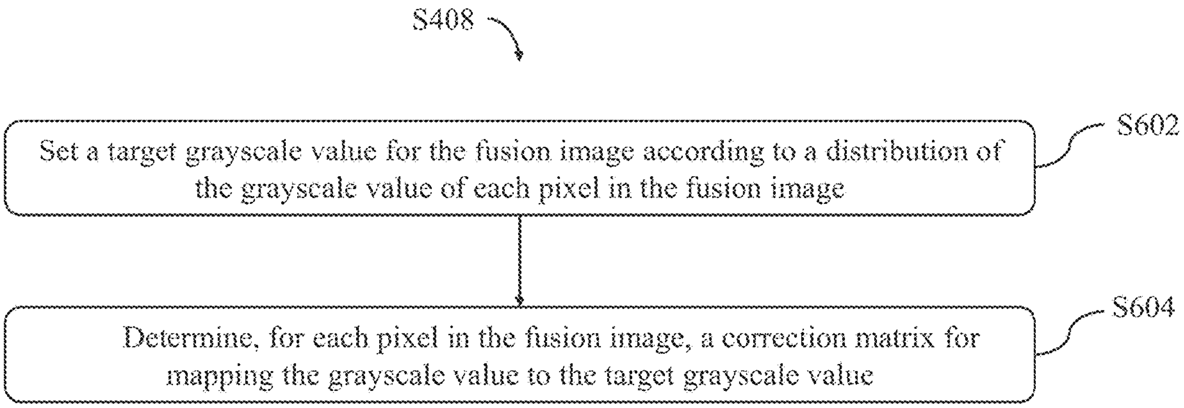
FIG. 6 illustrates a flowchart of sub-steps of the exemplary method for correcting nonuniformity of an NED shown in FIG. 4, according to some embodiments of the present disclosure.

FIG. 6 illustrates a flowchart of sub-steps of method 400 for correcting nonuniformity of an NED, according to some embodiments of the present disclosure. As shown in FIG. 6, step S408 further includes following sub-steps S602 and S604.

At sub-step S602, a target grayscale value is set for the fusion image according to a distribution of the grayscale values of the pixels in the fusion image. In some embodiments, the target grayscale value is an average grayscale value of each pixel in the fusion image. In some other embodiments, the target grayscale value is the grayscale value with a greatest probability in the distribution. A target value generally reflects a statistical status of the fusion image, and can be used to represent the fusion image.

Referring to FIG. 8, the luminance (CIE Y components) and chromaticity (CIE X and CIE Z components) distribution and uniformity for each channel (i.e., a standard red pattern, a standard green pattern, and a standard blue pattern) can be achieved for the first intermediate image and the second intermediate image. Then, the target luminance and target chromaticity for the display can be determined based on the fusion image of the first intermediate image and the second intermediate image. For example, as mentioned above, the target luminance can be calculated with consideration of the average value of all pixels or the value at a maximum in a probability distribution. The target chromaticity can be determined from the distribution of chromaticity (e.g., the distribution of CIE X and CIE Z components). The target chromaticity may also consider the white point or a standard color temperature (e.g., D65 or D55), and the color temperature of the target chromaticity can be shifted toward the standard color temperature. Once the target grayscale values of CIE X, CIE Y, and CIE Z are determined, the target for correction for each pixel in the first display and second display is set, which can be represented as the following target grayscale value matrix $[M_{3\times3}]_{obj}$:

$$[M_{3\times3}]_{obj} = \begin{bmatrix} X_R & X_G & X_B \\ Y_R & Y_G & Y_B \\ Z_R & Z_G & Z_B \end{bmatrix}_{obj} \tag{2}$$

In this 3×3 matrix, $X_R$ represents the target grayscale value of chroma component X under the standard red pattern, $Y_G$ represents the target grayscale value of luminance component Y under the standard green pattern, $Z_B$ represents the target grayscale value of chroma component Z under the standard blue pattern, etc. As can be understood, this matrix implements both luminance correction and chromaticity correction. If only the luminance correction is needed to be applied, then only the second row $[Y_R\ Y_G\ Y_B]_{obj}$ needs to be determined, and this matrix become a 1×3 matrix.

Referring back to FIG. 6, at sub-step S604, a correction matrix is determined for mapping the grayscale value to the target grayscale value for each pixel in the fusion image. In some embodiments, the standard red pattern, the standard green pattern, and the standard blue pattern contribute to form a part of the correction matrix. As mentioned above, a correction matrix $[M_{3\times3}]_{corr}$ is used for mapping the grayscale value of the any pixel represented in CIE XYZ $[M_{3\times3}]_{px}$ in the fusion image to the target grayscale value $[M_{3\times3}]_{obj}$, hence this process can be represented by the following formula:

$$[M_{3\times3}]_{px}[M_{3\times3}]_{corr} = [M_{3\times3}]_{obj} \tag{3}$$

In other words, the correction matrix $$[M_{3\times3}]_{corr} = \begin{bmatrix} \alpha_r & \alpha_g & \alpha_b \\ \beta_r & \beta_g & \beta_b \\ \mu_r & \mu_g & \mu_b \end{bmatrix}_{corr}$$

can be determined through the following equation:

$$[M_{3\times3}]_{corr} = [M_{3\times3}]_{px}'[M_{3\times3}]_{obj} \tag{4}$$

wherein, $[M_{3\times3}]_{px}'$ denotes the inverse of matrix $[M_{3\times3}]_{px}$, and $[M_{3\times3}]_{px}$ contains the actual pixel values that can be determined from the fusion image. As appreciated, $[M_{3\times3}]_{corr}$ can be generated for each of the 640×480 pixels.

In some embodiments, gamma operation in display driving system can also be considered when determining the correction scheme. For example, the correction matrix can be updated by a gamma operator γ for each pixel in the fusion image:

$$[M_{3\times3}]_{corr\_2} = [M_{3\times3}]_{corr}^{\frac{1}{\gamma}} = \begin{bmatrix} \alpha_r^{\frac{1}{\gamma}} & \alpha_g^{\frac{1}{\gamma}} & \alpha_b^{\frac{1}{\gamma}} \\ \beta_r^{\frac{1}{\gamma}} & \beta_g^{\frac{1}{\gamma}} & \beta_b^{\frac{1}{\gamma}} \\ \mu_r^{\frac{1}{\gamma}} & \mu_g^{\frac{1}{\gamma}} & \mu_b^{\frac{1}{\gamma}} \end{bmatrix} \tag{5}$$

When $[M_{3\times3}]_{corr\_2}$ is applied for correction, the driving system of the NED will not conduct another gamma correction to the pixels.

In some embodiments, the determined correction matrix can be saved for further processing. In some other embodiments, the determined correction matrix of each pixel in the fusion image can be used to update the driving system of the NED according to the correction matrix. The driving system can drive the first display and the second display with their corresponding drivers file with the corresponding correction matrix. For example, when a display pixel of the first display or the second display is driving a signal $$\begin{bmatrix} r_{in} \\ g_{in} \\ b_{in} \end{bmatrix}$$

in RGB chroma space, the driving system can correct this driving signal to $$\begin{bmatrix} r_{out} \\ g_{out} \\ b_{out} \end{bmatrix} = [M_{3\times3}]_{corr} \times \begin{bmatrix} r_{in} \\ g_{in} \\ b_{in} \end{bmatrix},$$

which is actually used to drive the pixel. When considering gamma operation, the driving system can instead correct this driving signal to $$\begin{bmatrix} r_{out} \\ g_{out} \\ b_{out} \end{bmatrix} = [M_{3\times3}]_{corr\_2} \times \begin{bmatrix} r_{in} \\ g_{in} \\ b_{in} \end{bmatrix}.$$

To review the quality of improvement with the correction scheme, the uniformity of the first display and the second display can be evaluated before and after correction. In some embodiments, the method for correcting nonuniformity further includes the following steps (not shown): displaying the test pattern on the first display and the second display by the updated driving system; and verifying an updated uniformity of the first display and the second display according to an updated fusion image of the test pattern.

Figure 9:
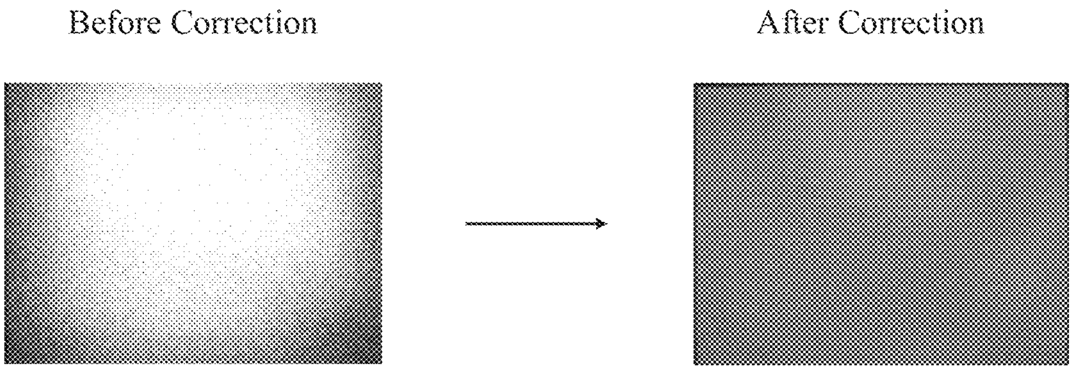
FIG. 9 illustrates an example of a fusion image before and after correction, according to some embodiments of the present disclosure.

FIG. 9 illustrates an example of experimental results of a fusion image before and after correction, according to some embodiments of the present disclosure. It can be seen from the experimental results shown in FIG. 9, by applying the method described above, the nonuniformity present before correction can be eliminated or at least diminished.

Some embodiments of the present disclosure further provide a non-transitory computer-readable storage medium storing a set of instructions that are executable by one or more processors of a device to cause the device to perform any of the above-mentioned method for correcting nonuniformity of an NED.

It should be noted that relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A method for correcting nonuniformity of a near-eye display (NED) having a first display and a second display, the method comprising:

generating and displaying a test pattern for the first display and the second display;

obtaining, in response to the test pattern, a first image at an end of a first optical path coupled to the first display and a second image at an end of a second optical path coupled to the second display;

fusing the first image and the second image to generate a fusion image; and determining a correction scheme for correcting nonuniformity of the NED based on the fusion image.

2. The method according to claim 1, wherein the first optical path and the second optical path each comprises an optical combiner, and at least a part of the nonuniformity is caused by the optical combiner.

3. The method according to claim 1, wherein fusing the first image and the second image to generate the fusion image comprises:

downsampling the first image and the second image to obtain a first intermediate image and a second intermediate image with a target resolution, respectively; and fusing the first intermediate image and the second intermediate image to form the fusion image.

4. The method according to claim 3, wherein the target resolution is equal to a display resolution of the first display and the second display.

5. The method according to claim 3, wherein fusing the first intermediate image and the second intermediate image to form the fusion image comprises:

fusing luminance components of the first intermediate image and the second intermediate image to form the fusion image.

6. The method according to claim 5, wherein fusing the first intermediate image and the second intermediate image to form the fusion image comprises:

fusing chromaticity components of the first intermediate image and the second intermediate image to form the fusion image.

7. The method according to claim 3, wherein the first image and the second image are represented by grayscale values, and a grayscale value of a pixel in a target location of the fusion image is equal to a grayscale value of a pixel in the target location of the first intermediate image plus a grayscale value of a pixel in the target location of the second intermediate image.

8. The method according to claim 7, wherein determining the correction scheme for correcting the nonuniformity of the NED based on the fusion image comprises:

setting a target grayscale value for the fusion image according to a distribution of the grayscale values of the pixels in the fusion image; and determining a correction matrix for mapping the grayscale value to the target grayscale value for each pixel in the fusion image.

9. The method according to claim 8, wherein determining the correction scheme for correcting the nonuniformity of the NED based on the fusion image further comprises:

updating, for each pixel in the fusion image, the correction matrix by a gamma operator.

10. The method according to claim 8, wherein the target grayscale value is an average grayscale value of each pixel in the fusion image, or the target grayscale value is the grayscale value with a greatest probability in the distribution.

11. The method according to claim 8, wherein the test pattern comprises a plurality of patterns, and the target grayscale value is set according to each of the plurality of patterns, wherein each of the plurality of patterns contributes to form a part of the correction matrix.

12. The method according to claim 11, wherein the test pattern comprises a standard red pattern, a standard green pattern, and a standard blue pattern in an RGB chroma space.

13. The method according to claim 8, wherein the NED comprises a driving system to drive the first display and the second display to display an image, and the method further comprises:

updating the driving system of the NED according to the correction matrix of each pixel in the fusion image.

14. The method according to claim 13, further comprising:

displaying the test pattern on the first display and the second display by the updated driving system; and verifying an updated uniformity of the first display and the second display according to an updated fusion image of the test pattern.

15. The method according to claim 1, wherein the first image, the second image, and the fusion image are represented in an XYZ chroma space.

16. A system for correcting nonuniformity of a near-eye display (NED) comprising a first display and a second display, the system comprising:

a light measuring device (LMD) configured to:

obtain, in response to a test pattern being displayed by the first display and the second display, a first image at an end of a first optical path coupled to the first display and a second image at an end of a second optical path coupled to the second display; and a processor configured to:

fuse the first image and the second image to generate a fusion image; and determine a correction scheme for correcting nonuniformity of the NED based on the fusion image.

17. The system according to claim 16, wherein the processor is further configured to generate the test pattern for the first display and the second display.

18. The system according to claim 16, wherein the first optical path and the second optical path each comprises an optical combiner, and at least a part of the nonuniformity is caused by the optical combiner.

19. The system according to claim 16, wherein the processor is configured to:

downsample the first image and the second image to obtain a first intermediate image and a second intermediate image with a target resolution, respectively; and fuse the first intermediate image and the second intermediate image to form the fusion image.

20. The system according to claim 19, wherein the first image and the second image are represented by grayscale values, and a grayscale value of a pixel in a target location of the fusion image is equal to a grayscale value of a pixel in the target location of the first intermediate image plus a grayscale value of a pixel in the target location of the second intermediate image.

21. The system according to claim 20, wherein the processor is configured to:

set a target grayscale value for the fusion image according to a distribution of the grayscale values of the pixels in the fusion image; and determine a correction matrix for mapping the grayscale value to the target grayscale value for each pixel in the fusion image.

22. The system according to claim 21, wherein the NED comprises a driving system to drive the first display and the second display to display an image, the processor being further configured to update the driving system of the NED according to the correction matrix of each pixel in the fusion image.

23. A non-transitory computer-readable storage medium storing a set of instructions that are executable by one or more processors of a device to cause the device to perform operations for correcting nonuniformity of a near-eye display (NED) having a first display and a second display, the operations comprising:

generating and displaying a test pattern for the first display and the second display;

obtaining, in response to the test pattern, a first image at an end of a first optical path coupled to the first display and a second image at an end of a second optical path coupled to the second display;

fusing the first image and the second image to generate a fusion image; and determining a correction scheme for correcting nonuniformity of the NED based on the fusion image.

* * * * *